United States Patent [19]

Yamamoto et al.

[11] Patent Number: 5,093,205
[45] Date of Patent: Mar. 3, 1992

[54] ANTISTATIC RESIN SHAPED ARTICLE AND PROCESS FOR PREPARATION THEREOF

[75] Inventors: Naoki Yamamoto, Hiroshima; Hiroki Hatakeyama, Ohtake, both of Japan

[73] Assignee: Mitsubishi Rayon Company Ltd., Tokyo, Japan

[21] Appl. No.: 447,825

[22] Filed: Dec. 8, 1989

[51] Int. Cl.$^5$ .................... B32B 27/08; C09K 3/16
[52] U.S. Cl. ..................... 428/520; 428/522; 428/922; 264/212; 526/287
[58] Field of Search ............... 428/520, 522, 922

[56] References Cited

U.S. PATENT DOCUMENTS

| | | | |
|---|---|---|---|
| 4,734,319 | 3/1988 | Doi et al. | 428/328 |
| 4,786,560 | 11/1988 | Crocker | 428/922 |
| 4,848,566 | 7/1989 | Havens et al. | 428/922 |
| 4,877,687 | 10/1989 | Azegami et al. | 428/522 |

FOREIGN PATENT DOCUMENTS 49-51371  5/1974  Japan.
63-108040  5/1988  Japan.

Primary Examiner—P. C. Sluby
Attorney, Agent, or Firm—Oblon, Spivak, McClelland, Maier & Neustadt

[57] ABSTRACT

A synthetic resin shaped article having good antistatic properties, composed of a substrate, at least part of which is covered with a synthetic resin surface layer integrated with the substrate. This shaped article is prepared by polymerizing 100 wt. parts of a mixture comprising (A) more than 20 wt. % of a monomer of the formula (I):

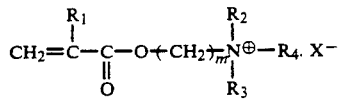

wherein $R_1$ is H or $CH_3$, $R_2$, $R_3$ and $R_4$ are H or $C_{1-9}$ alkyl, m is from 1 to 10, and $X^-$ is an anion, (B) less than 79.99 wt. % of a monomer having one unsaturated double bond and (C) 0.01-10 wt. % of a monomer having at least two unsaturated double bonds; subsequently adding (D) up to 190 wt. parts of a monomer having one unsaturated double bond and (E) up to 10 wt. parts of a monomer having at least two unsaturated double bonds to the formed polymer and polymerizing them to form a copolymer(a); forming a film of the copolymer(a) on the surface of a casting mold; supplying a starting material for a synthetic resin substrate into the casting mold; and polymerizing the starting material to transfer the film to the substrate surface from the molding surface.

10 Claims, 1 Drawing Sheet

ANTISTATIC RESIN SHAPED ARTICLE AND PROCESS FOR PREPARATION THEREOF

BACKGROUND OF THE INVENTION (1) Field of the Invention

The present invention relates to a synthetic resin shaped article having good and permanent antistatic properties, and a process for the preparation thereof.

(2) Description of the Related Art

Currently, the many synthetic resin shaped articles available have excellent properties, but in general, since they have a high electric resistance value, they are easily electrically charged by friction or the like and attract dust and foreign matter to thereby mar the appearance thereof.

As methods of imparting antistatic properties to synthetic resin shaped articles, there can be mentioned (1) an internal addition of a surface active agent, (2) a surface coating of a surface active agent, (3) a surface coating of a silicon compound, and (4) a surface modification by a plasma treatment. Among these methods, the methods (3) and (4) are disadvantageous in that the cost thereof is high, and therefore, the methods (1) and (2) are generally adopted.

In the method of an internal addition of a surface active agent, the surface active agent is incorporated or dispersed in a starting material for a synthetic resin before the polymerization, or in a synthetic resin before the molding, and therefore the preparation process can be simplified. But to obtain satisfactory antistatic properties, usually the amount added of the surface active agent added must be increased, which can result in a lowering of the mechanical strength of the synthetic resin. Further, the obtained antistatic characteristics are easily lost by water washing, friction or the like.

The method of surface coating a surface active agent is advantageous in that the physical properties of a synthetic resin as the substrate are not affected and good antistatic properties can be obtained by using a small amount of the surface active agent. Nevertheless, since the surface coating step is necessary, the cost is increased and there is a risk of a marring of an inherent aesthetically pleasing surface of the synthetic resin shaped article. Furthermore, the obtained antistatic properties are easily lost by water washing, friction or the like.

As apparent from the foregoing description, a synthetic resin shaped article having good and permanent properties while retaining the inherent physical properties of the synthetic resin has not been developed.

SUMMARY OF THE INVENTION

Under the above-mentioned background, the primary object of the present invention is to provide a synthetic resin shaped article having good and permanent antistatic properties.

More specifically, in accordance with one aspect of the present invention, there is provided an antistatic resin shaped article having improved antistatic properties which is composed of a synthetic resin substrate and a synthetic resin surface layer; at least part of said substrate being covered with said synthetic resin surface layer integrated therewith; said synthetic resin surface layer being comprised of a copolymer(a) prepared by the steps of polymerizing a monomer mixture comprising (A) more than 20% by weight of a monomer having a quaternary ammonium salt group, which is represented by the following general formula (I):

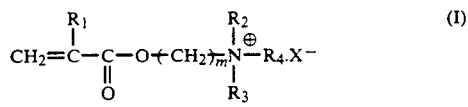

wherein $R_1$ represents a hydrogen atom or a methyl group, $R_2$, $R_3$ and $R_4$ represents a hydrogen atom or an alkyl group having 1 to 9 carbon atoms, which may have a substituent, m is an integer of from 1 to 10, and $X^-$ represents an anion of a quaternizing agent, (B) less than 79.99% by weight of a copolymerizable monomer having one unsaturated double bond and (C) 0.01 to 10% by weight of a copolymerizable monomer having at least two unsaturated double bonds, to prepare a copolymer (b) comprising the units derived from the monomers (A), (B) and (C); and further polymerizing (D) 0(exclusive) to 190 parts by weight of a copolymerizable monomer having one unsaturated double bond and (E) 0(exclusive) to 10 parts by weight of a copolymerizable monomer having at least two unsaturated double bonds in the presence of 100 parts by weight of the copolymer (b) comprising the units derived from the monomers (A), (B) and (C).

In another aspect of the present invention, there is provided a process for the preparation of the above-mentioned antistatic resin shaped article having improved antistatic properties, which comprises the steps of polymerizing 100 parts by weight of a monomer mixture comprising (A) more than 20% by weight of a monomer having a quaternary ammonium salt group, which is represented by the above general formula (I), (B) less than 79.99% by weight of a copolymerizable monomer having one unsaturated double bond and (C) 0.01 to 10% by weight of a copolymerizable monomer having at least two unsaturated double bonds, to prepare a copolymer (b) comprising the units derived from the monomers (A), (B) and (C); subsequently polymerizing (D) 0(exclusive) to 190 parts by weight of a copolymerizable monomer having one unsaturated double bond and (E) 0(exclusive) to 10 parts by weight of a copolymerizable monomer having at least two unsaturated double bonds in the presence of 100 parts by weight of the copolymer (b) to prepare a copolymer(a); forming a film of the copolymer(a) on the molding surface of a casting mold; supplying a starting material for a synthetic resin as a substrate into the casting mold; and polymerizing the starting material in the casting mold to transfer the film to the surface of the substrate from the molding surface of the casting mold.

DESCRIPTION OF THE PREFERRED EMBODIMENTS

Figure 1:
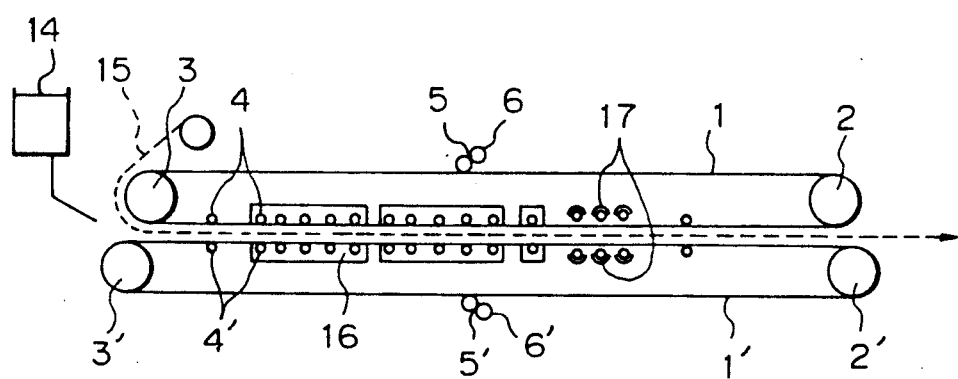
FIG. 1 illustrates an apparatus for the continuous preparation of a methacrylic resin sheet, which is provided with a device for coating a film-forming starting material. Reference numerals represent the following members.

The copolymer constituting the synthetic resin surface layer of the shaped article of the present invention is prepared from the above-mentioned monomers A, B, C, D and E. The monomer A has a quaternary ammonium salt and is represented by the general formula (I):

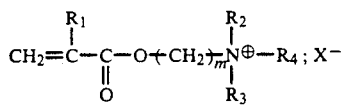   (I)

wherein $R_1$ represents a hydrogen atom or a methyl group, $R_2$, $R_3$ and $R_4$ represent a hydrogen atom or an alkyl group having 1 to 9 carbon atoms, which may have a substituent, m is an integer of from 1 to 10, and $X^-$ represents an anion of a quaternizing agent.

This monomer is obtained by quaternizing an acrylate or methacrylate having an amino group with a quaternizing agent. As the acrylate or methacrylate having an amino group, there can be mentioned dimethylaminoethyl methacrylate, diethylaminoethyl methacrylate, dimethylaminopropyl methacrylate, dimethylaminoethyl acrylate, diethylaminoethyl acrylate, dimethylaminobutyl methacrylate, dihydroxyethylaminoethyl methacrylate, dipropylaminoethyl methacrylate and dibutylaminoethyl methacrylate.

As the quaternizing agent, there can be mentioned alkyl sulfates such as dimethyl sulfate, diethyl sulfate and dipropyl sulfate, sulfonic acid esters such as methyl p-toluenesulfonate and methyl benzenesulfonate, alkyl phosphates such as trimethyl phosphate, and halides such as alkylbenzyl chlorides, benzyl chloride, alkyl chlorides and alkyl bromides. From the viewpoint of the resistance to thermal decomposition, an alkyl sulfate and a sulfonic acid ester are especially preferred. Thus, a preferable anion of the quaternizing agent of the monomer (A) is represented by the formula $R_7SO_3^-$ or $R_7OSO_3^-$ in which $R_7$ represents a hydrogen atom or an alkyl group having 1 to 20 carbon atoms, which may contain a phenyl group.

In the general formula (I), m is an integer of from 1 to 10, preferably from 2 to 6.

From the viewpoint of the adhesion between the copolymer imparting antistatic properties and the synthetic resin as the substrate, preferably the copolymerizable monomer (B) and/or (D) having one unsaturated double bond is the same as the monomer used for the preparation of the synthetic resin substrate or a monomer capable of forming a resin having a good compatibility with the synthetic resin substrate.

Known monomers can be used as the copolymerizable monomers (B) and (D) having one unsaturated double bond. For example, there can be mentioned methacrylic acid esters such as methyl methacrylate and ethyl methacrylate, acrylic acid esters such as methyl acrylate and ethyl acrylate, unsaturated carboxylic acids such as acrylic acid and methacrylic acid, acid anhydrides such as maleic anhydride and itaconic anhydride, maleimide derivatives such as N-phenylmaleimide, hydroxyl group-containing monomers such as 2-hydroxyethyl acrylate and 2-hydroxypropyl methacrylate, nitrogen-containing monomers such as acrylamide and acrylonitrile, and epoxy group-containing monomers such as allyl glycidyl ether and glycidyl acrylate. Furthermore, there can be used macromonomers such as methacrylate-terminated polymethyl methacrylate, styryl-terminated polymethyl methacrylate, methacrylate-terminated polystyrene, methacrylate-terminated polyethylene glycol and methacrylate-terminated acrylonitrile/styrene copolymers.

From the industrial viewpoint, preferably a compound represented by the following general formula (II):

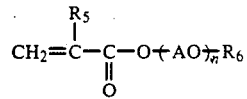   (II)

wherein $R_5$ represents a hydrogen atom or a methyl group, $R_6$ represents a hydrogen atom or an alkyl, aryl or aralkyl group having 1 to 18 carbon atoms, A represents an alkylene group having 2 to 4 carbon atoms, and n is an integer of from 0 to 500, is used as the copolymerizable monomers (B) and (D) having one unsaturated double bond.

As the compound of formula (II) in which n is 0, there can be mentioned methyl methacrylate, ethyl methacrylate, butyl methacrylate, lauryl methacrylate, ethylhexyl methacrylate, stearyl methacrylate, methyl acrylate, ethyl acrylate, benzyl methacrylate, phenyl methacrylate, cyclohexyl methacrylate and 2-hydroxyethyl methacrylate.

As the compound of formula (II) in which n is an integer of from 2 to 500, there can be mentioned polyethylene glycol(4) monomethacrylate, polyethylene glycol(23) monomethacrylate, polyethylene glycol(300) monomethacrylate, polyethylene glycol(23) monoacrylate, polypropylene glycol(23) monomethacrylate, polybutylene glycol(23) monomethacrylate, polyethylene glycol(23) monomethacrylate monomethyl ether, polyethylene glycol(23) monomethacrylate monobutyl ether, polyethylene glycol(23) monomethacrylate monostearyl ether, polyethylene glycol(23) monomethacrylate monophenyl ether, polyethylene glycol(23) monomethacrylate monobenzyl ether and polyethylene glycol(23) monomethacrylate oleyl ether (each parenthesized number indicates the number of alkylene glycol units in the polyalkylene glycol).

Where the synthetic resin as the substrate is a polymer composed mainly of methyl methacrylate, if a compound of formula (II) in which n is 0 is used, the adhesion between the synthetic resin as the substrate and the copolymer imparting antistatic properties is greatly improved, no copolymer remains on the casting mold upon peeling, and the antistatic properties can be stably manifested regardless of the kind of casting mold used.

When a compound of the general formula (II) in which n is an integer of from 2 to 500 is used, the release property of the obtained synthetic resin shaped article from the casting mold, especially the release property at a high temperature, is improved, and an antistatic synthetic resin shaped article can be stably obtained.

As the copolymerizable monomers (C) and (E) having at least two unsaturated double bonds, there can be mentioned allyl methacrylate, methallyl methacrylate, allyl acrylate, methallyl acrylate, vinyl methacrylate, vinyl acrylate, 1-chlorovinyl methacrylate, isopropenyl methacrylate, N-methacryloxymaleimide, ethylene glycol dimethacrylate, butanediol dimethacrylate, polyethylene glycol dimethacrylate, ethylene glycol diacrylate, allyl vinyl ether, allylvinylketone, trimethylolpropane trimethacrylate, pentaerythritol tetramethacrylate and triallyl cyanurate.

If one of the functional groups in the monomers (C) and (E) is a functional group having a poorer polymerizability than the methacryloyl or acryloyl group, such as an allyl, methallyl, vinyl, vinylidene or vinylene group, an unreacted double bond remains in the copolymer(a) and causes graft polymerization at the step of the polymerization for formation of the synthetic resin as the substrate, and therefore, a good adhesion is obtained between the copolymer imparting antistatic properties and the synthetic resin as the substrate. This feature also is preferred in that, at the time of graft polymerization of the copolymerizable monomer (D) having one unsaturated double bond, the grafting efficiency is increased to enhance the compatibility between the copolymer imparting antistatic properties and the synthetic resin as the substrate.

In the present invention, a monomer mixture comprising the monomer (A) having a quaternary ammonium salt group, the copolymerizable monomer (B) having one unsaturated double bond and the copolymerizable monomer (C) having at least two unsaturated double bonds is polymerized, and subsequently, preferably the copolymerizable monomer (D) having one unsaturated bond and the copolymerizable monomer (E) having at least two unsaturated double bonds are added and polymerized. Accordingly, the thus-formed copolymer has a graft chain composed of units of the copolymerizable monomer (D) having one unsaturated double bond, and this graft chain increases the compatibility between the synthetic resin as the substrate and the copolymer imparting antistatic properties and improves the dispersibility of this copolymer in the substrate resin. Furthermore, the graft chain has a cross-linked portion composed of units of the copolymerizable monomer (E) having at least two unsaturated double bonds and a residual double bond, and therefore, a semi-IPN structure is formed with the synthetic resin as the substrate and a chemical bonding is formed by graft polymerization to the residual double bond, with the result that the surface hardness of the obtained shaped article is improved and the adhesion between the synthetic resin as the substrate and the copolymer, i.e., the durability of the antistatic properties, is improved.

The amount of the copolymerizable monomer (D) having one unsaturated bond is 0(exclusive) to 190 parts by weight, more preferably 10 to 190 parts by weight, based on 100 parts by weight of the total of the monomers (A), (B) and (C). The amount of the copolymerizable monomer (E) having at least two unsaturated double bonds is 0(exclusive) to 10 parts by weight, more preferably 0.01 to 10 parts by weight, based on 100 parts by weight of the total of the monomers (A), (B) and (C).

Where the synthetic resin as the substrate is a polymer composed mainly of methyl methacrylate, preferably a compound of the above-mentioned general formula (II) in which n is 2 to 500 is used as the copolymerizable monomer (B) having one unsaturated bond, a compound of the above-mentioned general formula (II) in which n is 0, especially methyl methacrylate, is used as the copolymerizable monomer (D) having one unsaturated double bond, and allyl methacrylate or allyl acrylate is used as the copolymerizable monomers (C) and (E) having at least two unsaturated bonds.

The copolymer imparting antistatic properties in the present invention is obtained by polymerizing 100 parts by weight of a monomer mixture comprising more than 20% by weight of the monomer (A) having a quaternary ammonium salt group, 0(exclusive)% to 79.99 (exclusive)% by weight of the copolymerizable monomer (B) having one unsaturated double bond and 0.01 to 10% by weight of the copolymerizable monomer (C) having at least two unsaturated double bonds and subsequently, adding and polymerizing 0(exclusive) to 190 parts by weight of the copolymerizable monomer (D) having one unsaturated double bond and 0(exclusive) to 10 parts by weight of the copolymerizable monomer (E) having at least two unsaturated double bonds. Preferably, the proportions of the respective monomers is such that the amount of the monomer (A) having a quaternary ammonium salt group is more than 20% by weight but not more than 70% by weight, the sum of the copolymerizable monomers (B) and (D) having one unsaturated double bond is 20 to 79.9% by weight, and the sum of the copolymerizable monomers (C) and (E) having at least two unsaturated double bonds is 0.1 to 10% by weight.

If the amount of the monomer (A) having a quaternary ammonium salt group is not more than 20% by weight, good antistatic properties are not always obtained, if the sum of the copolymerizable monomers (B) and (D) having one unsaturated double bond is smaller than 20% by weight, the shapeability may be poor; if the sum of the copolymerizable monomers (C) and (E) having at least two unsaturated double bonds is smaller than 0.1% by weight, good surface hardness and good durability of antistatic properties cannot be always given to the obtained shaped article; and if the sum of the monomers (C) and (E) exceeds 10% by weight, it is difficult to coat the copolymer imparting antistatic properties uniformly on the casting mold. Use of the monomers (D) and (E) is preferable for stabilizing the durable antistatic properties and the surface hardness.

The main reason why the shaped article of the present invention has durable antistatic properties is that the copolymer imparting antistatic properties is integrated with the synthetic resin as the substrate. More specifically, the copolymer is swollen with the starting material for the synthetic resin as the substrate at the step of polymerizing this starting material, and in this state, the polymerization of the starting material is advanced to form an integrated layer of the copolymer imparting antistatic properties to the surface of the synthetic resin as the substrate of the shaped article obtained by the polymerization. Accordingly, the antistatic properties imparted by the invention are not lost by water washing or friction, and in this point, the antistatic properties imparted by the present invention are advantageous over the antistatic properties given by the customary method of coating a surface active agent on the surface of a shaped article. Moreover, in the present invention, since the copolymer imparting antistatic properties is present only in the surface portion, good antistatic properties can be obtained by even a small amount of the copolymer.

The kind of the synthetic resin to be used as the substrate in the present invention is not particularly critical, but in the present invention, the starting material for the synthetic resin must be used. By the term "starting material" used herein, we mean a material such that the polymerization degree and/or the property of the material can be changed by a reaction such as polymerization. For example, a polymer mixture or a polymer/monomer mixture or a monomer mixture can be used. Namely, any of starting materials can be used, as long as the polymerization degree and/or the property is changed by polymerization, crosslinking or another reaction. More specifically, there can be mentioned methyl methacrylate, styrene, other radical-polymerizable monomers, mixtures and polymers thereof, a polyol/polyisocyanate mixture, a mixture of an oligomer having epoxy groups at both of the terminals with a polyamine or polyamide, an unsaturated polyester, a novolak polymer/bisoxazoline mixture, a reactive silicone rubber oligomer, and a polycarbonate cyclic oligomer.

A methacrylic resin formed by using methyl methacrylate, a monomer mixture comprising at least 50% by weight of methyl methacrylate and up to 50% by weight of at least one monomer copolymerizable therewith or a partial polymerization product thereof as the starting material is especially preferable as the synthetic resin to be used as the substrate in the present invention.

As the monomer copolymerizable with methyl methacrylate, there can be mentioned methacrylic acid esters such as ethyl methacrylate, butyl methacrylate and 2-ethylhexyl methacrylate, acrylic acid esters such as methyl acrylate, ethyl acrylate, butyl acrylate and 2-ethylhexyl acrylate, unsaturated carboxylic acids such as acrylic acid, methacrylic acid, maleic acid and itaconic acid, acid anhydrides such as maleic anhydride and itaconic anhydride, maleimide derivatives such as N-phenylmaleimide, N-cyclohexylmaleimide and N-t-butylmaleimide, hydroxyl group-containing monomers such as 2-hydroxyethyl acrylate, 2-hydroxypropyl acrylate, 2-hydroxyethyl methacrylate and 2-hydroxypropyl methacrylate, nitrogen-containing monomers such as acrylamide, methacrylamide, diacetone acrylamide and dimethylaminoethyl methacrylate, epoxy group-containing monomers such as allyl glycidyl ether, glycidyl acrylate and glycidyl methacrylate, styrene type monomers such as styrene and α-methylstyrene, and crosslinking agents such as ethylene glycol diacrylate, allyl acrylate, ethylene glycol dimethacrylate, allyl methacrylate, divinylbenzene and trimethylolpropane triacrylate, although the copolymerizable monomers that can be used are not limited to those exemplified above.

The kind and amount of the copolymerizable monomer can be determined according to the intended synthetic resin shaped article.

Additives such as a colorant, a release agent, an ultraviolet absorber, a heat stabilizer, and a filler can be incorporated into the starting material for the synthetic resin as the substrate in the present invention.

As the casting mold to be used in the present invention, there can be mentioned casting molds composed of an inorganic glass such as a reinforced glass, a metal such as stainless steel, aluminum or chromium plating, or a resin such as a polyester resin. The surface of a casting mold of a glass or metal is generally a mirror surface, but a casting mold having a surface delustered by forming a multiplicity of fine protrusions thereon can be used when necessary.

As the means for forming a film of the copolymer imparting antistatic properties on the surface of the casting mold, a method of coating the copolymer in the form of a solution in water and/or an organic solvent is simple and preferable.

Components such as a release agent, a defoaming agent, a leveling agent, a monomer, and a crosslinking agent can be added to the solution or mixture of the copolymer, as long as the antistatic properties of the formed film, the polymerizability of the starting material for the synthetic resin as the substrate, and the physical properties of the substrate resin are not adversely affected.

As the means of coating the solution or mixture of the copolymer on the surface of the casting mold, there can be mentioned spray coating, flow coating, bar coating, and dip coating.

Where a plate-like methacrylic resin shaped article is prepared according to the present invention, from the industrial viewpoint it is preferable to adopt a continuous casting process using, as the casting mold, two confronting stainless steel endless belts having one mirror-polished surface and moved at the same speed in the same direction, and gaskets, as illustrated in the figure.

The present invention will now be described in detail with reference to the following examples that by no means limit the scope of the invention.

The electric properties of all of the samples were determined after a one day conditioning at a temperature of 20° C. and a relative humidity of 65%. The charge half-value time was measured under the conditions of an applied voltage of 10,000 V, a sample-rotating speed of 1,550 rpm, an application time of 30 seconds, a measurement temperature of 20° C., and a measurement relative humidity of 65%, using a static honest meter (supplied by Shishido Shokai), wherein the sample voltage at the time of application of the voltage was designated as the initial voltage (V), and the time required for reducing the sample voltage to ½ of the initial voltage after application of the voltage was designated as the charge half-value time (sec).

The surface resistivity ($\Omega$) was measured at a measurement temperature of 20° C. and a measurement relative humidity of 65% under an applied voltage of 500 V 1 minute after the application of the voltage, using an high megohm meter (Model TR-8601 supplied by Takeda-Riken). Each sample plate was cut to a size of 40 mm × 40 mm and the cut piece was wiped 60 times with gauze in running water, and the surface resistivity ($\Omega$) after the water washing was measured by the above-mentioned high megohm meter.

The surface hardness was determined according to the pencil scratch test of JIS K-5400 (usual paint test methods), and the transparency was evaluated based on the haze value determined by an integration ball-type haze meter (Model SEP-H-SS supplied by Nippon Seimitsu Kogaku).

EXAMPLE 1

A glass flask equipped with stirring vanes was charged with 112.2 parts by weight of diethylaminoethyl methacrylate and 220 parts by weight of methanol, and a mixture of 75.7 parts by weight of dimethyl sulfate and 40 parts by weight of methanol was added dropwise with stirring so that the inner temperature was kept below 30° C. After the dropwise addition, the mixture was stirred for 30 minutes to form a solution of a monomer (M-1) having a quaternary ammonium salt group.

To this solution were added 3 parts by weight of azobisisobutyronitrile, 2.5 parts by weight of n-octylmercaptan, 243 parts by weight of methanol, 249.1 parts by weight of polyethylene glycol(23) monomethacrylate monomethyl ether (the parenthesized value indicates the number of ethylene glycol units in the polyethylene glycol), and 9.4 parts by weight of allyl methacrylate, and polymerization was carried out for 1 hour at 60° C. in a nitrogen atmosphere. Subsequently, 186.8 parts by weight of methyl methacrylate and 9.4 parts by weight of allyl methacrylate were added to the reaction mixture, and polymerization was conducted for 5 hours at 60° C. in a nitrogen atmosphere to obtain a solution of a copolymer (P-1) imparting antistatic properties.

A film-forming starting material was formed by dissolving 5% by weight of the solution of the copolymer (P-1) in 95% by weight of methanol and this starting material was spray-coated and dried on the mirror surface of a stainless steel sheet having a length of 600 mm, a width of 450 mm, and a thickness of 3 mm and having one surface mirror-polished. A casting mold was assembled by using two of the thus-treated stainless steel sheets and gaskets so that the thickness of the formed sheet was 3 mm. A starting material for a synthetic resin, formed by dissolving 0.05 part by weight of 2,2-azobisisobutyronitrile as the polymerization initiator in 100 parts by weight of a partial polymerization product of methyl methacrylate (viscosity=1,000 cP at 20° C., polymerization degree=20%) and removing dissolved air by reducing the pressure, was cast into the casting mold. Polymerization was carried out for 10 hours at 60° C. and for 4 hours at 110° C., the temperature was dropped to normal temperature, and the shaped article was released from the mold. The surface resistivity of the methacrylate resin plate was $1.2 \times 10^{10}$ Ω, the charge half-value time was 1 second, and the haze value was 1.0%.

The obtained plate was subjected to the water washing treatment, and the antistatic properties were immediately evaluated. It was found that the surface resistivity was $9.5 \times 10^9$ Ω and the charge half-value time was 1 second. When determined according to the pencil scratch test of JIS K-5400, it was found that the surface hardness was 3H.

COMPARATIVE EXAMPLE 1

A methacrylic resin plate having a thickness of 3 mm was prepared in the same manner as described in Example 1 except that stainless steel mirror-surface sheets not treated with the antistatic polymer were used.

The surface resistivity of the obtained plate was higher than $10^{16}$ Ω, the charge half-value time was more than 120 seconds, the haze value was 1.0%, and the surface hardness was 3H.

EXAMPLES 2 through 13

Copolymers (P-2) through (P-13) having a composition shown in Table 2 were prepared in the same manner as in Example 1 by using as the monomer (A) the same monomer (M-1) as used in Example 1, or a monomer (M-2), (M-3), (M-4) or (M-5) having a quaternary ammonium salt group, which were prepared from a combination of an amino group-containing acrylate or methacrylate and a quaternizing agent, shown in Table 1, in the same manner as in Example 1.

Methacrylic resin plates having a thickness of 3 mm were prepared from these copolymers in the same manner as described in Example 1.

The evaluation results are shown in Table 2.

COMPARATIVE EXAMPLES 2 through 4

Copolymers (P-14), (P-15) and (P-16) having a composition shown in Table 2 were prepared by using the solution of the monomer (M-1), and methacrylic resin plates having a thickness of 3 mm were obtained in the same manner as described in Example 1 by using these copolymers. The evaluation results are shown in Table 2.

From the results obtained in Comparative Examples 2 and 3 it is seen that, if the copolymerizable monomers (C) and (E) having at least two unsaturated double bonds are not used, the surface hardness of the shaped article is lowered.

From the results obtained in Comparative Example 4 it is seen that, if the amount of the monomer (A) having a quaternary ammonium salt group in the copolymer is not more than 20% by weight, good antistatic properties cannot be imparted.

TABLE 1

| Monomer (A) | Amine-Containing Acrylate or Methacrylate | Quaternizing Agent |
|---|---|---|
| M-2 | Dimethylaminoethyl methacrylate | Diethyl sulfate |
| M-3 | Dimethylaminoethyl methacrylate | Methyl p-toluene-sulfonate |
| M-4 | Dimethylaminoethyl methacrylate | Methyl chloride |
| M-5 | Dimethylaminoethyl acrylate | Dimethyl sulfate |

TABLE 2

| Example No. | Co-polymer | Monomer (A) | ratio (%) | Monomer (B) | ratio (%) | Monomer | ratio (%) | Monomer (C) | ratio (%) | Monomer (D) | ratio (%) | | ratio (%) | Monomer (E) | ratio (%) |
|---|---|---|---|---|---|---|---|---|---|---|---|---|---|---|---|
| 2 | P-2 | M-1 | 29 | PEG(500) | 39 | — | — | AMA | 1.5 | MMA | 29 | — | — | AMA | 1.5 |
| 3 | P-3 | M-1 | 29 | — | — | MMA | 29 | AMA | 1.5 | — | — | PEG(23) | 39 | AMA | 1.5 |
| 4 | P-4 | M-1 | 29 | PEG(23) | 19.5 | MMA | 14.5 | AMA | 1.5 | MMA | 14.5 | PDG(23) | 19.5 | AMA | 1.5 |
| 5 | P-5 | M-1 | 29 | PEG(23) | 19.5 | HEMA | 14.5 | AMA | 1.5 | HEMA | 14.5 | PEG(23) | 19.5 | AMA | 1.5 |
| 6 | P-6 | M-1 | 49 | PEG(23) | 24 | — | — | AMA | 1.5 | MMA | 24 | — | — | AMA | 1.5 |
| 7 | P-7 | M-1 | 24 | PEG(23) | 24 | — | — | AMA | 1.5 | MMA | 49 | — | — | AMA | 1.5 |
| 8 | P-8 | M-1 | 68 | PEG(23) | 14.5 | — | — | AMA | 1.5 | — | — | PEG(23) | 14.5 | AMA | 1.5 |
| 9 | P-9 | M-1 | 29.5 | PEG(23) | 39.2 | — | — | AMA | 1.5 | MMA | 29.5 | — | — | EDMA | 0.3 |
| 10 | P-10 | M-2 | 34 | PEG(23) | 34 | — | — | AMA | 1.5 | MMA | 29 | — | — | AMA | 1.5 |
| 11 | P-11 | M-3 | 29 | PEG-23 | 39 | — | — | AMA | 1.5 | MMA | 29 | — | — | AMA | 1.5 |
| 12 | P-12 | M-4 | 29 | PEG-23 | 39 | — | — | AMA | 1.5 | MMA | 29 | — | — | AMA | 1.5 |
| 13 | P-13 | M-5 | 29 | PEG-23 | 39 | — | — | AMA | 1.5 | MMA | 29 | — | — | AMA | 1.5 |
| Comparative Example 2 | P-14 | M-1 | 30 | PEG-23 | 40 | — | — | — | — | MMA | 30 | — | — | — | — |
| Comparative Example 3 | P-15 | M-1 | 30 | PEG-23 | 40 | MMA | 30 | — | — | — | — | — | — | — | — |
| Comparative Example 4 | P-16 | M-1 | 15 | PEG-23 | 15 | MMA | 68 | AMA | 2 | — | — | — | — | — | — |

TABLE 2-continued ative
Example

| Example No. | Co-polymer | surface initial (Ω) | resistivity after water-washing (Ω) | surface hardness (pencil hardness) |
|---|---|---|---|---|
| 2 | P-2 | $8.6 \times 10^9$ | $1.2 \times 10^9$ | 3H |
| 3 | P-3 | $2.2 \times 10^{10}$ | $1.5 \times 10^{10}$ | 2H |
| 4 | P-4 | $1.7 \times 10^{10}$ | $1.0 \times 10^{10}$ | 3H |
| 5 | P-5 | $8.8 \times 10^9$ | $8.0 \times 10^9$ | 3H |
| 6 | P-6 | $6.5 \times 10^9$ | $7.2 \times 10^9$ | 3H |
| 7 | P-7 | $8.3 \times 10^{11}$ | $6.3 \times 10^{11}$ | 3H |
| 8 | P-8 | $1.3 \times 10^9$ | $2.5 \times 10^9$ | 2H |
| 9 | P-9 | $9.5 \times 10^9$ | $9.2 \times 10^9$ | 3H |
| 10 | P-10 | $5.2 \times 10^{10}$ | $4.1 \times 10^{10}$ | 3H |
| 11 | P-11 | $4.3 \times 10^{10}$ | $3.5 \times 10^{10}$ | 3H |
| 12 | P-12 | $7.5 \times 10^9$ | $7.2 \times 10^9$ | 3H |
| 13 | P-13 | $9.2 \times 10^9$ | $8.7 \times 10^9$ | 3H |
| Comparative Example 2 | P-14 | $1.3 \times 10^{10}$ | $2.4 \times 10^{10}$ | 2B |
| Comparative Example 3 | P-15 | $1.6 \times 10^{10}$ | $2.2 \times 10^{10}$ | 2B |
| Comparative Example 4 | P-16 | $4.5 \times 10^{14}$ | $6.3 \times 10^{14}$ | 3H |

Note
%: % by weight
PEG(500): polyethylene glycol(500) monomethacrylate monomethyl ether
PEG(23): polyethylene glycol(23) monomethacrylate monomethyl ether
MMA: methyl methacrylate
HEMA: 2-hydroxyethyl methacrylate
AMA: allyl methacrylate
EDMA: ethylene glycol dimethacrylate Each parenthesized number indicates the number of ethylene glycol units in polyethylene glycol.

EXAMPLE 14

A methacrylic resin plate having a thickness of 3 mm was prepared in the same manner as described in Example 1 except that a reinforced glass sheet having a length of 600 mm, a width of 450 mm, and a thickness of 6 mm was used for the casting mold.

The surface resistivity of the resin plate was $7.2 \times 10^9$ Ω, the charge half-value time was 1 second, the haze value was 1.0%, and the surface hardness was 3H.

The surface resistivity after water washing was $6.5 \times 10^9$ Ω, and the charge half-value time after water washing was 1 second.

EXAMPLE 15

A methacrylic resin plate having a thickness of 3 mm was prepared in the same manner as described in Example 1 except that a laminate of a stainless steel sheet having a length of 600 mm, a width of 450 mm, and a thickness of 3 mm, and a polyester film having a thickness of 250 μm (Luminor, standard type, supplied by Toray) adhered on the stainless steel sheet was used for the casting mold.

The surface resistivity of the resin plate was $8.5 \times 10^9$ Ω, the charge half-value time was 1 second, and the surface hardness was 3H.

The surface resistivity after water washing was $8.6 \times 10^9$ Ω, and the charge half-value time after water washing was 1 second.

EXAMPLE 16

An apparatus for the continuous production of a methacrylic resin plate, as shown in FIG. 1 was used as the casting mold.

Referring to FIG. 1, belts 1 and 1' having a width of 1.5 m and a thickness of 1 mm, and having one surface mirror-polished, were travelled at a speed of 2 m/min by driving a main pulley 2'. An initial tension on the belts was given by arranging a hydraulic cylinder on pulleys 2 and 2', and was set at 10 kg/mm² of the belt section. Each reference numeral 3 and 3' represents a pulley.

A film-forming starting material 5,5' comprising 1.0% by weight of copolymer (P-1), 98.0% by weight of methyl methacrylate and 1.0% by weight of methanol was coated on the mirror surfaces of the belts 1 and 1' by roll coaters 6 and 6'.

The thus-treated belts were arranged to confront each other and both side portions thereof were sealed by gaskets in the form of pipes 15 composed of plastizied polyvinyl chloride. A starting material 14 for a synthetic resin as the substrate, which comprised 100 parts by weight of a partial polymerization product of methyl methacrylate (the content of the polymer having an average polymerization degree of 1,800 was 21% by weight), 0.05 part by weight of 2,2'-azobis(2,4-dimethylvaleronitrile), and 0.01 part by weight of Tinuvin P was cast in the space between the belts through a casting device by a metering pump.

The entire length of the polymerization zone was 96 m. In the former portion having a length of 66 m, the distance between the surfaces of the belts was regulated by idle rollers 4 and 4' arranged at intervals of 15 cm, and warm water maintained at 80° C. was sprayed and scattered through nozzles from the outer surfaces of the belts to heat the starting material. In the latter portion having a length of 30 m, the belts were supported by idle rollers arranged at intervals of 1 m, and the material between the belts was heated to about 130° C. by an infrared ray heater 17 and the obtained product was cooled and then separated from the belts. In this manner, a methacrylic resin sheet having a thickness of 3 mm was continuously prepared.

The surface resistivity of the obtained resin sheet was $1.5 \times 10^{10}$ Ω, the charge half-value time was 1 second, the haze value was 1.0%, and the surface hardness was 3H. The surface resistivity after water washing was $9.8 \times 10^{9}$ Ω, and the charge half-value time after water washing was 1 second.

COMPARATIVE EXAMPLE 5

A methacrylic resin plate having a thickness of 3 mm was prepared in the same manner as described in Example 1 except that a laminate formed by adhering a polyester film onto the surface of a stainless steel sheet having a length of 600 mm, a width of 450 mm, and a thickness of 3 mm was used for the casting mold and the copolymer obtained in Comparative Example 3 was used as the copolymer imparting antistatic properties.

The surface resistivity of the obtained resin sheet was $7.8 \times 10^{9}$ Ω, and the surface hardness was 2B. After water washing, the surface resistance value was $3.5 \times 10^{-}$Ω. From these results, it is seen that if the copolymerizable monomers (C) and (E) having at least two unsaturated double bonds are not used, a good resistance to water washing, i.e., a good durability of the antistatic properties, cannot be imparted.

As apparent from the foregoing description, according to the present invention, a synthetic resin shaped article having good and durable antistatic properties with no lowering of the inherent physical properties of the synthetic resin, and a process for the preparation of this synthetic resin shaped article, are provided, and the occurrence of antistatic problems arising when synthetic resins are utilized, can be prevented.

We claim:

1. A synthetic resin shaped article having improved antistatic properties which is comprised of a synthetic resin substrate and a synthetic resin surface layer; at least part of said substrate being covered with said synthetic resin surface layer integrated therewith; said synthetic resin surface layer being comprised of a copolymer (a) produced by polymerizing a monomer mixture comprising:

(A) more than 20% by weight of a monomer having a quaternary ammonium salt group, which is represented by the formula (I):

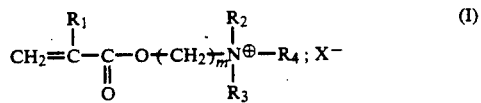

wherein $R_1$ represents a hydrogen atom or a methyl group, $R_2$, $R_3$ and $R_4$ represent a hydrogen atom or an alkyl group having 1 to 9 carbon atoms, which is unsubstituted or substituted by a hydroxyl group, m is an integer of from 1 to 10, and $X^-$ represents an anion of a quaternizing agent, (B) less than 79.99% by weight of a copolymerizable monomer having one unsaturated double bond, and (C) 0.01 to 10% by weight of a copolymerizable monomer having at least two unsaturated double bonds, to prepare a copolymer (b) comprising the units derived from the monomers (A), (B) and (C); and further polymerizing (D) in a positive amount of up to 190 parts by weight of a copolymerizable monomer having one unsaturated double bond and (E) in a positive amount of up to 10 parts by weight of a copolymerizable monomer having at least two unsaturated double bonds in the presence of 100 parts by weight of the copolymer (b) comprising the units derived from the monomers (A), (B) and (C), and wherein the copolymerizable monomer of (B) and (D) are selected from the group of compounds having the formula (II):

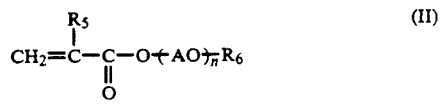

wherein $R_5$ represents a hydrogen atom or a methyl group, $R_6$ represents a hydrogen atom or an alkyl, aryl, or aralkyl group having 1 to 18 carbon atoms, A represents an alkylene group having 2 to 4 carbon atoms, and n is an integer of from 0 to 500.

2. A synthetic resin shaped article according to claim 1 wherein said synthetic resin shaped article being prepared by forming a film of the copolymer(a) on the molding surface of a mold, supplying a starting material for the synthetic resin substrate into the casting mold, and polymerizing the starting material in the casting mold to transfer the film of the copolymer(a) to the surface of the substrate from the molding surface of the mold.

3. A synthetic resin shaped article according to claim 2 wherein the film of the copolymer(a) is formed on the molding surface of the mold by coating the molding surface with a solution of the copolymer(a) in a medium selected from the group consisting of water and organic solvents.

4. A synthetic resin shaped article according to claim 1, wherein the monomer of (D) is used in an amount of 10 to 190 parts by weight and the monomer of (E) is used in an amount of 0.01 to 10 parts by weight.

5. A synthetic resin shaped article according to claim 1, wherein at least one of the copolymerizable monomers of (B) and (D) having one unsaturated double bond is the same as the monomer constituting the synthetic resin as the substrate or a monomer capable of forming a resin having a good compatibility with the synthetic resin as the substrate.

6. A synthetic resin shaped article according to claim 1, wherein the starting material for the synthetic resin as the substrate is methyl methacrylate, a monomer mixture comprising at least 50% by weight of methyl methacrylate and up to 50% by weight of at least one monomer copolymerizable therewith, or a partial polymerization product thereof.

7. A synthetic resin shaped article according to claim 1, wherein n is the formula (II) is an integer of from 2 to 500.

8. A synthetic resin shaped article according to claim 1, wherein the copolymerizable monomers of (C) and (E) having at least two unsaturated double bonds are compounds in which at least one of the functional groups is an allyl group, a methallyl group, a vinyl group, a vinylidene group or a vinylene group.

9. A synthetic resin shaped article according to claim 1, wherein the anion of the quaternizing agent of the monomer of (A) having a quaternary ammonium salt group, represented by the general formula (I), is represented by the formula $R_7SO_3^-$ or $R_7OSO_3^-$ in which $R_7$ represents a hydrogen atom or an alkyl group having 1 to 20 carbon atoms, which may contain a phenyl group.

10. A synthetic resin shaped article according to claim 1, wherein the copolymerizable monomer of (B) having one unsaturated double bond is a compound represented by the following general formula (II):

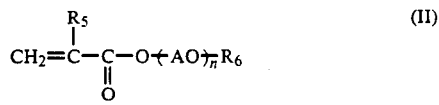

wherein $R_5$ represents a hydrogen atom or a methyl group, $R_6$ represents a hydrogen atom or an alkyl, aryl or aralkyl group having 1 to 18 carbon atoms, A represents an alkylene group having 2 to 4 carbon atoms, and n is an integer of from 2 to 500; the copolymerizable monomer of (D) having one unsaturated double bond is methyl methacrylate; and the copolymerizable monomers of (C) and (E) having at least two unsaturated double bonds are allyl methacrylate or allyl acrylate.

* * * * *